(12) United States Patent
Lipkin et al.

(10) Patent No.: US 10,717,166 B2
(45) Date of Patent: Jul. 21, 2020

(54) MOTORIZED APPARATUS FOR USE WITH ROTARY MACHINES

(71) Applicant: General Electric Company, Schenectady, NY (US)

(72) Inventors: Don Mark Lipkin, Niskayuna, NY (US); Todd William Danko, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 690 days.

(21) Appl. No.: 15/367,340

(22) Filed: Dec. 2, 2016

(65) Prior Publication Data

US 2018/0154490 A1    Jun. 7, 2018

(51) Int. Cl.
| | | |
|---|---|---|
| B23Q 9/00 | (2006.01) | |
| F01D 5/00 | (2006.01) | |
| H04N 7/18 | (2006.01) | |
| B23Q 17/24 | (2006.01) | |
| F01D 9/02 | (2006.01) | |
| F01D 21/00 | (2006.01) | |

(52) U.S. Cl.
CPC ....... B23Q 17/2409 (2013.01); B23Q 9/0007 (2013.01); F01D 5/005 (2013.01); F01D 9/02 (2013.01); F01D 21/003 (2013.01); H04N 7/185 (2013.01); *F05D 2220/30* (2013.01); *F05D 2230/72* (2013.01); *F05D 2230/80* (2013.01); *F05D 2240/35* (2013.01); *F05D 2270/8041* (2013.01)

(58) Field of Classification Search
CPC ... B23Q 17/2409; B23Q 9/0007; H04N 7/185
See application file for complete search history.

(56) References Cited

U.S. PATENT DOCUMENTS

| | | |
|---|---|---|
| 5,155,941 A | 10/1992 | Takahashi et al. |
| 5,164,826 A | 11/1992 | Dailey |
| 5,197,191 A | 3/1993 | Dunkman et al. |
| 5,254,413 A | 10/1993 | Maricocchi |

(Continued)

FOREIGN PATENT DOCUMENTS

| | | |
|---|---|---|
| EP | 1251191 A1 | 10/2002 |
| EP | 1304446 A1 | 4/2003 |

(Continued)

OTHER PUBLICATIONS

A Schicht et al., "Monitoring system for thermal barrier coatings with RF radar measurement", Electronics Letters, vol. 43, Issue: 24, pp. 1357-1359, Nov. 22, 2007.

(Continued)

*Primary Examiner* — Irfan Habib
(74) *Attorney, Agent, or Firm* — Armstrong Teasdale LLP (57) ABSTRACT

A motorized apparatus for use in maintaining a turbine assembly includes a body configured to move through the turbine assembly. The motorized apparatus also includes at least one maintenance device coupled to the body. The motorized apparatus further includes a drive system configured to move the body relative to the turbine assembly. The drive system includes a motor and a steering component. The steering component is configured to steer the motorized apparatus relative to the turbine assembly.

17 Claims, 2 Drawing Sheets

(56) References Cited

U.S. PATENT DOCUMENTS

| | | | |
|---|---|---|---|
| 5,388,528 A * | 2/1995 | Pelrine | B62D 49/04 |
| | | | 104/138.2 |
| 5,644,394 A | 7/1997 | Owens | |
| 5,723,078 A | 3/1998 | Nagaraj et al. | |
| 5,809,099 A * | 9/1998 | Kim | G05D 1/0236 |
| | | | 376/249 |
| 6,010,746 A | 1/2000 | Descoteaux et al. | |
| 6,049,978 A | 4/2000 | Arnold | |
| 6,101,951 A * | 8/2000 | Sigel | E03F 3/06 |
| | | | 104/138.2 |
| 6,235,352 B1 | 5/2001 | Leverant et al. | |
| 6,378,627 B1 * | 4/2002 | Tubel | E21B 4/18 |
| | | | 175/24 |
| 6,414,458 B1 | 7/2002 | Hatley et al. | |
| 6,548,982 B1 * | 4/2003 | Papanikolopoulos | B62D 57/02 |
| | | | 318/568.11 |
| 6,569,492 B2 | 5/2003 | Fernihough et al. | |
| 6,820,653 B1 * | 11/2004 | Schempf | B08B 9/043 |
| | | | 138/97 |
| 6,827,969 B1 | 12/2004 | Skoog et al. | |
| 6,919,121 B2 | 7/2005 | Stowell et al. | |
| 7,008,522 B2 | 3/2006 | Boucard et al. | |
| 7,032,279 B2 | 4/2006 | McCarvill et al. | |
| 7,056,185 B1 * | 6/2006 | Anagnostou | A63H 17/262 |
| | | | 180/167 |
| 7,233,221 B2 * | 6/2007 | Reboredo Losada | B60B 3/048 |
| | | | 105/78 |
| 7,271,894 B2 | 9/2007 | Devitt et al. | |
| 7,309,512 B2 | 12/2007 | Srinivasan | |
| 7,387,814 B2 | 6/2008 | Fischer et al. | |
| 7,476,703 B2 | 1/2009 | Ruud et al. | |
| 7,509,735 B2 | 3/2009 | Philip et al. | |
| 7,544,520 B2 | 6/2009 | Duda et al. | |
| 7,748,327 B2 * | 7/2010 | Suzuki | A61B 1/00147 |
| | | | 104/138.2 |
| 8,039,773 B2 | 10/2011 | Spallek et al. | |
| 8,400,501 B2 | 3/2013 | Heyworth et al. | |
| 8,496,990 B2 | 7/2013 | Tuppen et al. | |
| 8,563,080 B2 | 10/2013 | Hopkins | |
| 8,602,722 B2 | 12/2013 | George et al. | |
| 8,609,185 B2 | 12/2013 | Tuppen et al. | |
| 8,646,347 B2 * | 2/2014 | Dubbeldam | F16L 3/1066 |
| | | | 73/865.8 |
| 8,904,635 B2 | 12/2014 | Berkebile et al. | |
| 9,060,781 B2 * | 6/2015 | Farritor | A61B 18/1445 |
| 9,085,053 B2 | 7/2015 | Tholen et al. | |
| 9,329,377 B2 * | 5/2016 | Kell | G02B 23/2423 |
| 9,487,254 B2 * | 11/2016 | Rochat | B62D 57/024 |
| 9,540,497 B2 | 1/2017 | Lipkin et al. | |
| 9,543,050 B2 * | 1/2017 | Blanchard | G21F 7/02 |
| 10,456,883 B2 * | 10/2019 | Rivers | G05B 19/404 |
| 2003/0221315 A1 | 12/2003 | Baumann et al. | |
| 2004/0043160 A1 | 3/2004 | Fusaro, Jr. et al. | |
| 2005/0067466 A1 | 3/2005 | Boegli et al. | |
| 2006/0042083 A1 | 3/2006 | Baker et al. | |
| 2007/0202269 A1 | 8/2007 | Potter et al. | |
| 2008/0252726 A1 * | 10/2008 | Chan | B23Q 17/2409 |
| | | | 348/143 |
| 2009/0094829 A1 | 4/2009 | Bunting et al. | |
| 2011/0059321 A1 | 3/2011 | Skoog et al. | |
| 2011/0174565 A1 | 7/2011 | Rochat et al. | |
| 2011/0206533 A1 | 8/2011 | Lee et al. | |
| 2013/0167375 A1 * | 7/2013 | Roesing | F01D 5/005 |
| | | | 29/888.3 |
| 2013/0232792 A1 | 9/2013 | Quinones et al. | |
| 2014/0067185 A1 | 3/2014 | Tralshawala et al. | |
| 2014/0130583 A1 * | 5/2014 | Kell | G01M 15/14 |
| | | | 73/112.05 |
| 2014/0193664 A1 * | 7/2014 | Thompson | F01D 5/288 |
| | | | 428/633 |
| 2015/0040394 A1 | 2/2015 | Spanos et al. | |
| 2015/0092039 A1 * | 4/2015 | Ruhge | G01B 21/16 |
| | | | 348/82 |
| 2015/0174837 A1 | 6/2015 | Kolvick et al. | |
| 2015/0174838 A1 | 6/2015 | Kittleson et al. | |
| 2015/0175486 A1 | 6/2015 | Roberts et al. | |
| 2015/0209915 A1 * | 7/2015 | Rautenberg | B23P 6/002 |
| | | | 29/888.021 |
| 2015/0240984 A1 * | 8/2015 | Choi | H04N 7/185 |
| | | | 348/84 |
| 2015/0241308 A1 * | 8/2015 | Pandey | G01M 15/14 |
| | | | 73/112.01 |
| 2015/0318912 A1 | 11/2015 | Zahnd et al. | |
| 2017/0043418 A1 * | 2/2017 | Pierce | B23C 3/122 |
| 2017/0182623 A1 * | 6/2017 | Sugitani | B23B 41/12 |
| 2018/0003060 A1 | 1/2018 | Lipkin et al. | |
| 2018/0100396 A1 | 4/2018 | Lipkin et al. | |
| 2018/0223667 A1 * | 8/2018 | Danko | F01D 5/005 |

FOREIGN PATENT DOCUMENTS

| | | |
|---|---|---|
| EP | 1591549 A1 | 11/2005 |
| EP | 1881154 A1 | 1/2008 |
| JP | H11-141351 A | 5/1999 |
| JP | 2008-225012 A | 9/2008 |
| WO | 2005056877 A1 | 6/2005 |
| WO | 2007147387 A2 | 12/2007 |

OTHER PUBLICATIONS

Saha, A. Environmental Barrier coating and methods of preparation, GE Application No. 201641006985, filed on Feb. 29, 2016.

International Search Report and Written Opinion issued in connection with corresponding PCT Application No. PCT/US2017/062600 dated Feb. 22, 2018.

\* cited by examiner

MOTORIZED APPARATUS FOR USE WITH ROTARY MACHINES

BACKGROUND

The field of the disclosure relates generally to motorized apparatus and, more particularly, to motorized apparatus for inspecting and/or repairing rotary machines.

At least some known rotary machines, such as turbines for aircraft engines and gas and steam powered turbines for industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the rotary machine.

During operation, the components of the rotary machine experience degradation. Accordingly, for at least some known rotary machines, periodic inspections, such as borescope inspections, are performed to assess the condition of the rotary machine in-between service intervals. Examples of damage observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and blade tip shrouds).

During service intervals, the rotary machines are at least partially disassembled to allow repair and/or replacement of damaged components. For example, damaged components of at least some known rotary machines are primarily repaired at overhaul or component repair facilities, with only limited intervention conducted in the field. Processes used to repair compressor and turbine flowpath components include surface cleaning to remove accumulated dirt and oxidation products, stripping and restoration of coated surfaces, crack repair, section replacement, and aero contouring and smoothing. Repairing the components during service intervals reduces the cost to maintain the rotary machine because the cost to repair components is sometimes less than the cost to replace the components. However, sometimes, the components run past their repair limits between planned service intervals. In addition, sometimes, heavily distressed components fail and cause an unplanned outage.

For at least some known rotary machines, a tethered device, such as a borescope, is inserted through an opening of the rotary machine and manipulated within a cavity of the rotary machine for inspection. However, at least some known tethered devices do not access all locations of the rotary machine. In particular, some non-rotating components in at least some known rotary machines are difficult to access with a tethered device. Furthermore, damage detected during inspection is typically unmitigated until the machine is at least partially disassembled for scheduled service.

BRIEF DESCRIPTION

In one aspect, a motorized apparatus for use in maintaining a turbine assembly is provided. The motorized apparatus includes a body configured to move through the turbine assembly. The motorized apparatus also includes at least one maintenance device coupled to the body. The motorized apparatus further includes a drive system configured to move the body relative to the turbine assembly. The drive system includes at least one motor and a steering component. The steering component is configured to steer the motorized apparatus relative to the turbine assembly.

In another aspect, a system for maintaining a turbine assembly is provided. The system includes a motorized apparatus including a body configured to move through the turbine assembly. The motorized apparatus also includes at least one maintenance device coupled to the body and a drive system configured to move the body relative to the turbine assembly. The drive system includes at least one motor and a steering component. The steering component is configured to steer the motorized apparatus relative to the turbine assembly. The motorized apparatus also includes a communication component configured to receive information. The system also includes a controller positioned remotely from the motorized apparatus. The controller is configured to send information to the motorized apparatus.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein provide motorized apparatus for use in maintaining rotary machines. The motorized apparatus is configured to move through a turbine assembly. The motorized apparatus is self-propelled. For example, the motorized apparatus includes a drive system that enables the motorized apparatus to travel to locations of the turbine assembly that are difficult to reach by at least some known maintenance devices, such as through the primary cavity of said turbine assembly. The motorized apparatus includes at least one maintenance device that facilitates inspecting and/or repairing the rotary machine. Moreover, in some embodiments, the motorized apparatus includes a coupling component that facilitates maintaining the drive system of the apparatus engaged with a surface of the turbine assembly during travel. In some embodiments, the motorized apparatus further includes an anchoring system that maintains the position of the motorized apparatus while the motorized apparatus performs a function such as inspecting, repairing, and/or rotating with rotating components of the rotary machine. As a result, the motorized apparatus provides increased access to difficult-to-reach locations within the turbine assembly and reduces the amount of time the rotary machine is out of service for maintenance.

Figure 1:
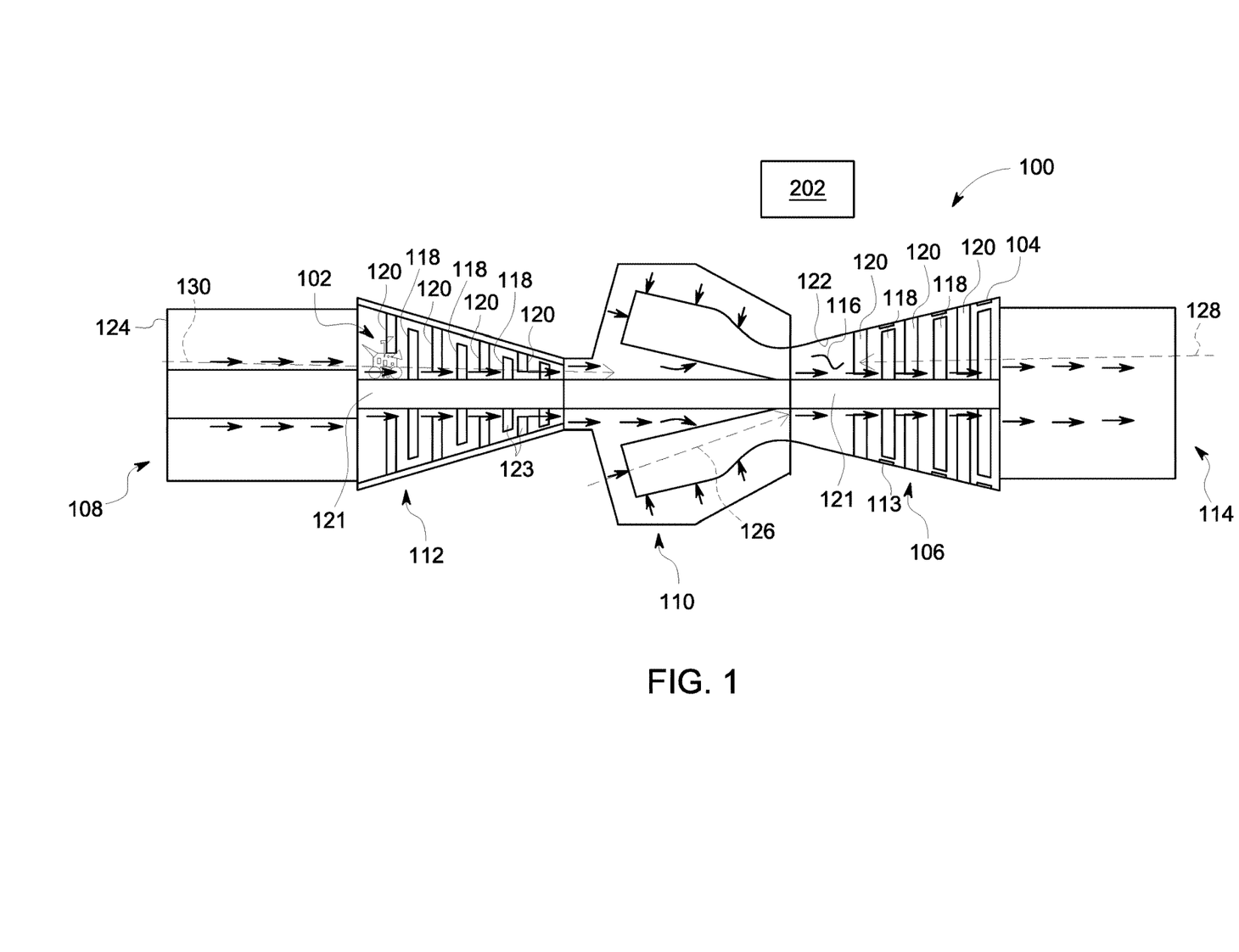
FIG. 1 is a cross-sectional schematic view of an exemplary rotary machine and an exemplary motorized apparatus.

FIG. 1 is a cross-sectional schematic view of an exemplary rotary machine and a motorized apparatus 102. In the exemplary embodiment, the rotary machine includes a turbine assembly 100. In alternative embodiments, the rotary machine includes any assembly. For example, in some embodiments, the rotary machine includes, without limitation, any of the following: a compressor, a blower, a pump, a turbine, a motor, and a generator.

In the exemplary embodiment, turbine assembly 100 includes an outer case 104, a turbine 106, an inlet 108, a combustor 110, a compressor 112, and an exhaust 114. Fluid flows from inlet 108, through compressor 112, through combustor 110, through turbine 106 and is discharged through exhaust 114. Together, outer case 104, blades 118, guide vanes 120, and shrouds 113 define a primary flowpath inside compressor 112 and turbine 106 of turbine assembly 100. This flowpath, combined with a flowpath through combustor 110, defines a primary cavity within turbine assembly 100. In alternative embodiments, turbine assembly 100 is configured in any manner that enables turbine assembly 100 to operate as described herein.

Also, in the exemplary embodiment, compressor 112 and turbine 106 include airfoils configured to direct fluid through turbine assembly 100. In particular, compressor 112 and turbine 106 include blades 118 and guide vanes 120. Blades 118 are operably coupled with rotating shaft 121 such that blades 118 rotate when rotating shaft 121 rotates. Guide vanes 120 and shrouds 113 are stationary components and are coupled to an inner surface 122 of outer case 104. Blades 118 and guide vanes 120 generally are positioned alternatingly along the rotor axis within turbine assembly 100. In alternative embodiments, compressor 112 and/or turbine 106 includes any airfoils that enable turbine assembly 100 to operate as described herein.

In addition, in the exemplary embodiment, motorized apparatus 102 is configured to travel through turbine assembly 100. Accordingly, motorized apparatus 102 facilitates maintenance of turbine assembly 100. For example, motorized apparatus 102 facilitates inspection and repair of turbine assembly 100 at locations that are difficult to access from an exterior of turbine assembly 100, such as the primary cavity of said turbine assembly. Moreover, motorized apparatus 102 is self-propelled, meaning that motorized apparatus 102 moves within turbine assembly 100 without an external force acting on motorized apparatus 102.

During operation, motorized apparatus 102 enters turbine assembly 100 through any suitable access port or opening 124 of turbine assembly 100. For example, in some embodiments, motorized apparatus 102 travels along path 126 through combustor 110. In another embodiment, motorized apparatus 102 enters turbine assembly 100 through exhaust 114 and travels along path 128 through turbine 106. In further embodiments, motorized apparatus 102 enters turbine assembly 100 through inlet 108 and travels along path 130 through compressor 112. In alternative embodiments, motorized apparatus 102 moves along any path that enables motorized apparatus 102 to operate as described herein.

Also, during operation, motorized apparatus 102 is used to inspect and/or repair any interior components of turbine assembly 100. For example, motorized apparatus 102 is moved along at least one of paths 126, 128, and 130 within the primary cavity of turbine assembly 100. In some embodiments, motorized apparatus 102 is positioned adjacent a portion of interior surface 123 of turbine assembly 100. Interior surface 123 is any surface within the primary cavity of turbine assembly 100. For example, in some embodiments interior surface 123 includes, without limitation, surfaces of blades 118, guide vanes 120, shrouds 113, and combustor 110. In some embodiments, motorized apparatus 102 detects a characteristic of interior surface 123. For example, in some embodiments, motorized apparatus 102 is used to generate an image of interior surface 123 and the image is examined to determine whether repairs are necessary. If repairs are necessary, motorized apparatus 102 can be used to repair interior surface 123. For example, in some embodiments, motorized apparatus 102 patches a damaged portion of interior surface 123. After inspection and/or repair of interior surface 123, motorized apparatus 102 exits turbine assembly 100 through any suitable access port or opening of turbine assembly 100, such as along paths 126, 128, and 130.

While inside turbine assembly 100, motorized apparatus 102 travels along any surfaces and in any direction through turbine assembly 100 to reach a desired location for inspection and/or repair. In some embodiments, rotating shaft 121 facilitates positioning motorized apparatus 102 circumferentially within the primary cavity of turbine assembly 100. For example, in some embodiments, motorized apparatus 102 is anchored to one or more blades 118 and is rotated to a desired position, such as adjacent to a guide vane 120 or inner shroud 113. In further embodiments, motorized apparatus 102 is anchored to stationary components of turbine assembly 100, such as to one or more guide vanes 120, and rotating shaft 121 is rotated to bring motorized apparatus 102 into proximity of a blade 118. In alternative embodiments, motorized apparatus 102 is positioned in any manner that enables motorized apparatus 102 to operate as described herein. In further embodiments, motorized apparatus 102 drives onto an airfoil, such as a blade 118 or guide vane 120, using coupling mechanism 142 to maintain drive system 138 of motorized apparatus 102 engaged with interior surface 123 of turbine assembly 100 during travel. In addition, in some embodiments, anchoring mechanism 152 is used to maintain the position of motorized apparatus 102 while motorized apparatus 102 rotates on rotating shaft 121 and/or while motorized apparatus 102 executes maintenance functions, including inspection and repair.

Figure 2:
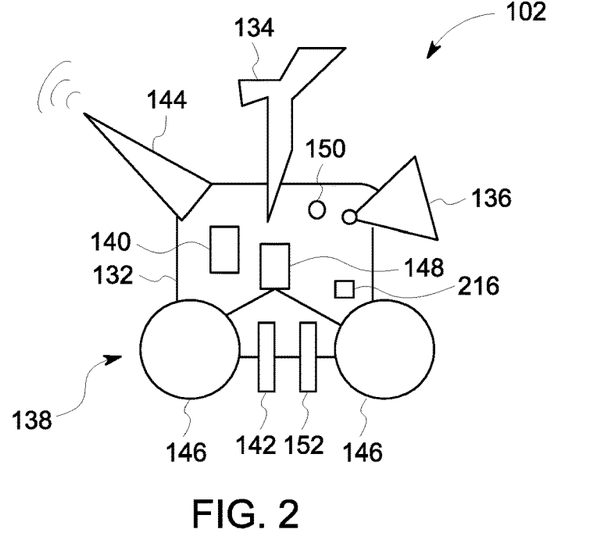
FIG. 2 is a schematic view of the motorized apparatus shown in FIG. 1.

FIG. 2 is a schematic view of motorized apparatus 102. Motorized apparatus 102 includes a body 132, a first maintenance device 134, a second maintenance device 136, a drive system 138, a coupling mechanism 142, an anchoring mechanism 152, and a communication component 144. Communication component 144 includes a transceiver configured to send and/or receive information or data. In alternative embodiments, motorized apparatus 102 includes any components that enable motorized apparatus 102 to operate as described herein.

In the exemplary embodiment, motorized apparatus 102 is sized and shaped to fit within turbine assembly 100 (shown in FIG. 1) and to travel through said turbine assembly 100, such as through the primary cavity of said turbine assembly (shown in FIG. 1). For example, body 132 has a height, length, and width that are less than a clearance required to fit within the primary cavity of turbine assembly 100. The height, length, and width define a volume of body 132. In some embodiments, body 132 occupies a volume in a range of about 1 cubic centimeter (0.06 cubic inches) to about 1,000 cubic centimeters (61 cubic inches). In further embodiments, body 132 occupies a volume in a range of about 75 cubic centimeters (4.6 cubic inches) to about 125 cubic centimeters (7.6 cubic inches). For example, in some embodiments, body 132 has a height of approximately 50 millimeters (2 inches), a length of approximately 50 mm (2 inches), and a width of approximately 35 mm (1.4 inches). In alternative embodiments, motorized apparatus 102 includes any body 132 that enables motorized apparatus 102 to operate as described herein.

Also, in the exemplary embodiment, drive system 138 is coupled to body 132, which forms a chassis of motorized apparatus 102. Drive system 138 is configured to move body 132 relative to turbine assembly 100 (shown in FIG. 1). Drive system 138 includes a drive mechanism, such as a plurality of wheels 146, and one or more motors 148 drivingly coupled to the drive mechanism. A power source 150, such as a battery, provides power for operation of motor 148. During operation, motor 148 induces rotation of wheels 146 relative to body 132. Motorized apparatus 102 moves along a surface as wheels 146 rotate in contact with the surface. In alternative embodiments, motorized apparatus 102 includes any drive system 138 that enables motorized apparatus 102 to operate as described. For example, in some embodiments, drive system 138 includes a drive mechanism other than wheels 146, such as treads, tracks, worms, legs, electromagnetic or fluidic locomotion mechanisms.

In addition, in the exemplary embodiment, first maintenance device 134 includes a repair tool. In particular, first maintenance device 134 includes an applicator configured to apply a repair material to a surface, such as interior surface 123 of the primary cavity of turbine assembly 100 (shown in FIG. 1). Second maintenance device 136 includes a sensor. In particular, second maintenance device 136 includes a camera for generating image data of the interior surface 123 of turbine assembly 100 (shown in FIG. 1). In some embodiments, first maintenance device 134 and/or second maintenance device 136 is movable relative to body 132. In alternative embodiments, motorized apparatus 102 includes any maintenance device 134 that enables motorized apparatus 102 to operate as described herein. For example, in some embodiments, maintenance device 134 includes, without limitation, any of the following: an applicator, a drill, a grinder, a heater. For example, in some embodiments, maintenance device 136 includes, without limitation, any of the following: a visual sensor, a mechanical sensor, a temperature sensor, a magnetic sensor, an infrared sensor, an acoustic sensor, and an eddy current sensor.

Moreover, in the exemplary embodiment, drive system 138 includes steering component 140 configured to steer motorized apparatus 102 as motorized apparatus 102 moves. In particular, steering component 140 directs motorized apparatus 102 as wheels 146 propel motorized apparatus 102. In the exemplary embodiment, steering component 140 includes a controller that differentially drives motors that drive wheels 146 to translate motorized apparatus 102 forward and backward and steer motorized apparatus 102. In some embodiments, steering component 140 includes a controller that controls a motor (not shown) to move an articulated steering mechanism and turn drive wheels such that motorized apparatus 102 is steered as it translates forward or backward. In some embodiments, steering component 140 steers motorized apparatus 102 based at least in part on information received via communication component 144. In further embodiments, motorized apparatus 102 is at least partially automated and steering component 140 steers motorized apparatus 102 based at least in part on information from any components of motorized apparatus 102, such as second maintenance device 136. In alternative embodiments, motorized apparatus 102 includes any steering component 140 that enables motorized apparatus 102 to operate as described herein.

In reference to FIGS. 1 and 2, in the exemplary embodiment, coupling mechanism 142 is configured to adjustably couple motorized apparatus 102 to a surface of the turbine assembly 100, such as to interior surface 123 of the primary cavity. Coupling mechanism 142 extends from the bottom of body 132 towards a surface of turbine assembly 100. In the exemplary embodiment, coupling mechanism 142 includes a magnet that magnetically couples to ferromagnetic material of turbine assembly 100, such as inlet plenum, exhaust plenum, compressor blades, compressor rotor, and compressor guide vanes. Accordingly, coupling mechanism 142 facilitates motorized apparatus 102 remaining coupled to at least a portion of turbine assembly 100 during drive motion. In some embodiments, coupling mechanism 142 prevents motorized apparatus 102 from falling or sliding during traverse on highly inclined or even inverted surfaces. In the exemplary embodiment, coupling mechanism 142 couples motorized apparatus 102 to turbine assembly 100 with a force sufficient to overcome gravitational forces while still allowing for motion using drive system 138. In some embodiments, coupling mechanism 142 is controllably activated, deactivated or adjusted in strength, such as by adjusting the gap between the coupling magnet and the interior surface 123 of turbine assembly 100 on which the motorized apparatus is located. In exemplary embodiments, coupling mechanism 142 extends from the top, sides, front, and/or sides of body 132. In some embodiments, coupling mechanism 142 is contained at least partially within the bounds of the body 132. In exemplary embodiments, coupling mechanism 142 includes, without limitation, fans, thrusters, electrostatic adhesion, suction devices, and/or vacuum adhesion devices. In exemplary embodiments, coupling mechanism 142 maintains body 132 on interior surface 123 of turbine assembly 100 with a force in the range from about 0.1 N to about 10 N. In alternative embodiments, motorized apparatus 102 includes any coupling mechanism 142 that enables motorized apparatus 102 to operate as described herein.

In the exemplary embodiment, anchoring mechanism 152 is configured to selectively anchor to the surface of turbine assembly 100 and inhibit movement of motorized apparatus 102 relative to at least a portion of turbine assembly 100, such as to interior surface 123 of the primary cavity of turbine assembly 100. In some embodiments, motorized apparatus 102 anchors to blade 118 or between adjacent blades 118, and may, in some embodiments, be moved circumferentially within the primary cavity of turbine assembly 100 by rotating shaft 121. In some embodiments, motorized apparatus 102 anchors to a guide vane 120 or between adjacent guide vanes. In some embodiments, anchoring mechanism 152 is sufficiently strong as to allow execution of maintenance tasks that require forces to be applied between maintenance device 134, 136 and interior surface 123 of turbine assembly 100. In some embodiments, anchoring mechanism 152 is controllably activated and deactivated. In alternative embodiments, motorized apparatus 102 includes any anchoring mechanism 152 that enables motorized apparatus 102 to operate as described herein. For example, in some embodiments, anchoring mechanism 152 includes, without limitation, any of the following: clamps, screws, magnets, cords, adhesives, suction ports, hooks, electrostatics, springs, latches, and combinations thereof. In some embodiments, anchoring function may be achieved without use of a distinct anchoring mechanism 152. For example, anchoring can be achieved by adjusting the distance between a magnet of coupling mechanism 142 and interior surface 123 until a required attractive force is achieved between body 132 of motorized apparatus 102 and interior surface 123 of turbine assembly 100. In exemplary embodiments, anchoring mechanism 152 maintains the position of body 132 on the interior surface 123 of turbine assembly 100 with a force in the range from about 1 N to about 100 N.

Figure 3:
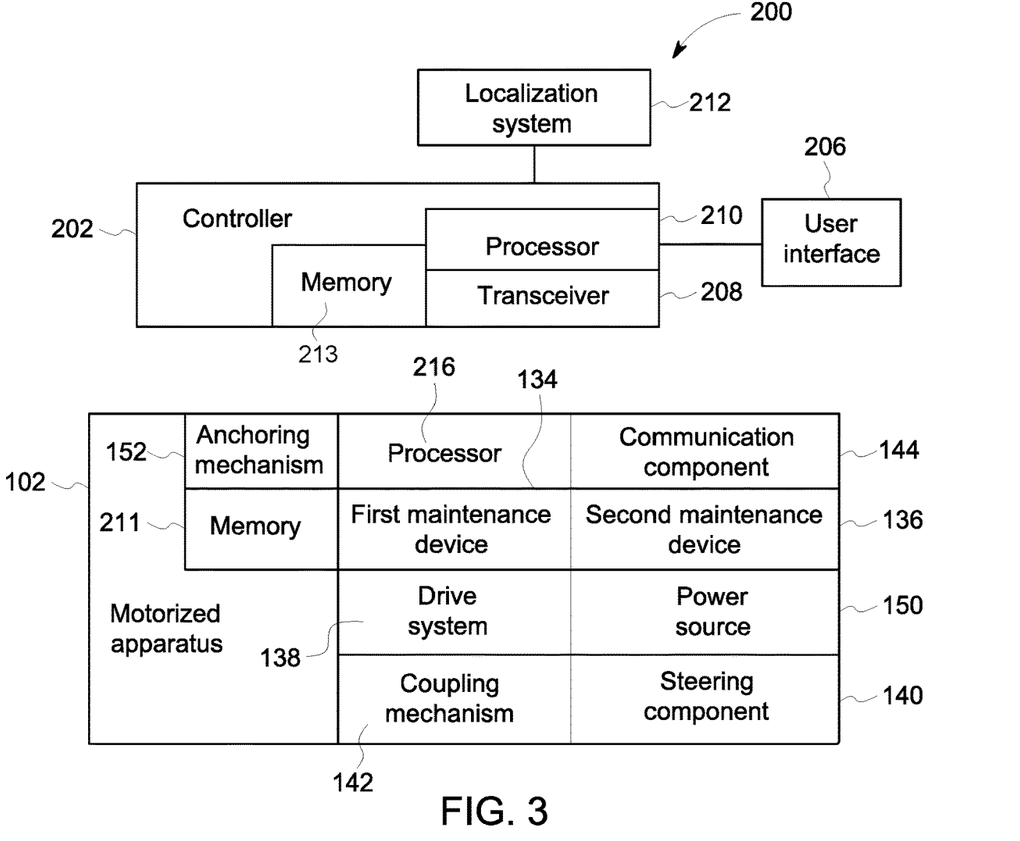
FIG. 3 is a schematic view of exemplary system for use in maintaining the rotary machine shown in FIG. 1.

FIG. 3 is a schematic view of an exemplary system 200 for use in maintaining turbine assembly 100 (shown in FIG. 1). System 200 includes motorized apparatus 102, a controller 202, a user interface 206, and a localization system 212. In alternative embodiments, system 200 includes any component that enables system 200 to operate as described herein. For example, in some embodiments, user interface 206 is omitted.

In the exemplary embodiment, controller 202 includes a transceiver 208, a processor 210, and memory 213. Transceiver 208 is communicatively coupled with motorized apparatus 102 and is configured to send information to and receive information from a communication component 144 of motorized apparatus 102. In the exemplary embodiment, transceiver 208 and communication component 144 communicate wirelessly. In alternative embodiments, motorized apparatus 102 and controller 202 communicate in any manner that enables system 200 to operate as described herein. For example, in some embodiments, controller 202 and motorized apparatus 102 exchange information through a wired link extending between motorized apparatus 102 and controller 202.

In some embodiments, second maintenance device 136 is configured to detect a characteristic of turbine assembly 100 (shown in FIG. 1) and generate data relating to the characteristic. Transceiver 208 is configured to receive information relating to the characteristic detected by second maintenance device 136.

In addition, in the exemplary embodiment, motorized apparatus 102 includes a processor 216 and a memory 211. Processor 216 is configured to execute instructions for controlling first maintenance device 134, second maintenance device 136, coupling mechanism 142, anchoring mechanism 152, steering component 140 and/or drive system 138 of motorized apparatus 102. In alternative embodiments, motorized apparatus 102 includes any processor 216 that enables system 200 to operate as described herein. In some embodiments, processor 216 is omitted.

Also, in the exemplary embodiment, user interface 206 is configured to display information relating to the characteristics detected by second maintenance device 136 for interpretation by the user. For example, in some embodiments, user interface 206 displays images of interior surface 123 of turbine assembly 100. In some embodiments, user interface 206 allows a user to input and/or view information relating to control of motorized apparatus 102. In an exemplary embodiment, user interface 206 is configured to display information relating to the state of one or more of first maintenance device 134, second maintenance device 136, drive system 138, power source 150, coupling mechanism 142, anchoring mechanism 152, and steering component 140 for interpretation by the user. For example, state information may include the position of one or more of first maintenance device 134, second maintenance device 136, coupling mechanism 142, and anchoring mechanism 152 relative to body 132 of the motorized apparatus. State information may also include charge status of power source 150 and/or current draw on the various drive and positioning motors. Processor 210 translates user inputs into steering, tool motion, camera control, sensor control, sensor motion, and/or any other commands and sends information via transceiver 208 to motorized apparatus 102 via communication component 144. In some embodiments, user control of motorized apparatus 102 is in real time, such as through a joystick, keyboard, touchscreen or other interface having similar function. In other embodiments, motorized apparatus 102 is controlled partially or wholly according to a pre-programmed routine. In some embodiments, a user inputs information, such as operation goals or conditional directions and motorized apparatus 102 is at least partially automated. In further embodiments, information, such as information received by controller 202 from motorized apparatus 102, control data sent to motorized apparatus 102, and additional user inputs or state information (e.g., location, time, orientation, datalink quality, battery levels, repair material levels, failure mode indicators), is logged into memory 211 and/or memory 213.

In reference to FIGS. 1 and 3, in the exemplary embodiment, controller 202 is positioned on the exterior of turbine assembly 100 and communicates with motorized apparatus 102 positioned within turbine assembly 100. For example, controller 202 is configured to send information to motorized apparatus 102 relating to the propulsion and/or steering of motorized apparatus 102 while motorized apparatus 102 is moving within the primary cavity of the turbine assembly 100. In alternative embodiments, controller 202 and motorized apparatus 102 are configured in any manner that enables system 200 to operate as described herein. For example, in some embodiments, controller 202 and user interface 206 may be positioned in or adjacent to inlet 108, exhaust 114, or combustor 110 of turbine assembly 100, In addition, in the exemplary embodiment, localization system 212 determines a position of motorized apparatus 102 relative to turbine assembly 100 based on information received from motorized apparatus 102. In a further embodiment, localization system 212 determines a position of first maintenance device 134 and/or second maintenance device 136 and/or body 132 of the motorized apparatus relative to interior surface 123 of turbine assembly 100. In some embodiments, localization system 212 indirectly detects a position of motorized apparatus 102 based on characteristics detected by second maintenance device 136 and/or additional sensors, such as proximity sensors, located on motorized apparatus 102. For example, in some embodiments, second maintenance device 136 includes a camera and localization system 212 determines a position of motorized apparatus 102 based on an image of a portion of turbine assembly 100 visible to motorized apparatus 102, such as by comparing the image data to a model of the turbine assembly 100. In alternative embodiments, localization system 212 determines a position of motorized apparatus 102 in any manner that enables motorized apparatus 102 to operate as described herein. For example, in some embodiments, localization system 212 utilizes pre-existing or purposefully placed landmarks within turbine assembly 100 to determine a position of motorized apparatus 102. In further embodiments, devices such as borescopes and/or illuminators are positioned through access ports (not shown) in outer case 104 to facilitate localization system 212 determining a position of motorized apparatus 102. In some embodiments, localization system 212 utilizes radiography to facilitate determining a position of motorized apparatus 102.

In some embodiments, localization system 212 may additionally use an inclinometer (not shown) and/or rotational velocity sensor (not shown) and/or magnetometer (not shown) located on motorized apparatus 102 to measure the motorized apparatus's 102 roll, pitch and yaw with regard to the direction of gravity and/or known environmental magnetic field orientations. Comparing measurements of the motorized apparatus's 102 roll, pitch and yaw with a-priori knowledge of the rotary machine's interior surfaces 123, the localization system can partially or fully recognize the location of motorized apparatus 102 within the rotary machine.

In some embodiments, localization system 212 is incorporated into controller 202. In alternative embodiments, system 200 includes any localization system 212 that enables system 200 to operate as described herein. For example, in some embodiments, localization system 212 is included entirely within motorized apparatus 102 such that motorized apparatus 102 detects and interprets information relating to a position of motorized apparatus 102. In such embodiments, an external component of localization system 212 is unnecessary. In further embodiments, localization system 212 is distinct from controller 202 and motorized apparatus 102. In some embodiments, the localization system 212 may combine multiple pieces of data from localization system, first maintenance device 134, and or second maintenance device 136 to estimate the motorized apparatus's 102 position with regard to interior surfaces 123 of the rotary machine.

In some embodiments, localization system 212 is at least partially distinct from motorized apparatus 102 and motorized apparatus 102 detects and sends information to those components of localization system 212 that are distinct from motorized apparatus 102. In some such embodiments, localization system 212 at least partially processes the information such that localization system 212 is at least partially automated. In further embodiments, the information is received by a user via user interface 206 and is at least partially interpreted by the user.

In some embodiments, localization system 212 is adjustable between different modes. For example, in some embodiments, localization system 212 operates in an at least partially manual mode and switches to an automated mode when necessary, such as when signal is lost between an exterior user interface and motorized apparatus 102.

The above described embodiments provide motorized apparatus for use in maintaining rotary machines. The motorized apparatus is configured to move through a turbine assembly. The motorized apparatus is self-propelled. For example, the motorized apparatus includes a drive system that enables the motorized apparatus to travel to locations of the turbine assembly that are difficult to reach by at least some known maintenance devices. The motorized apparatus includes at least one maintenance device that facilitates inspecting and/or repairing the rotary machine. Moreover, in some embodiments, the motorized apparatus includes a coupling component that facilitates maintaining the drive system of the apparatus engaged with a surface of the turbine assembly during travel. In some embodiments, the motorized apparatus further includes an anchoring system that maintains the position of the motorized apparatus while the motorized apparatus performs a function such as inspecting, repairing, and/or rotating with rotating components of the rotary machine.

An exemplary technical effect of the methods, systems, and apparatus described herein includes at least one of: (a) reducing the time to inspect and/or repair rotary machines; (b) increasing the accessibility of difficult-to-reach locations within a turbine assembly for inspection and/or in situ repair; (c) reducing the time that rotary machines are out of service for maintenance; (d) increasing the precision and reliability of inspection and/or repair of rotary machines; (e) reducing unplanned service outages for a rotary machine; (f) enabling the extension of planned service outages of a rotary machine for inspection and/or repair; and (g) enhancing data capture for use in quantifying and/or modeling the service condition of at least some components of the rotary machine.

Exemplary embodiments of methods, systems, and apparatus for maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a motorized apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motorized apparatus for use in maintaining a turbine assembly, said motorized apparatus comprising:
   a body configured to move through the turbine assembly;
   at least one maintenance device coupled to said body, wherein said at least one maintenance device comprises a repair tool;
   a drive system configured to move said body relative to the turbine assembly, said drive system comprising a motor and a steering component configured to steer said motorized apparatus relative to the turbine assembly;
   a coupling mechanism configured to couple said body to an interior surface of the turbine assembly during motion along the interior surface; and
   an anchoring component configured to maintain said motorized apparatus in position relative to the interior surface of the turbine assembly during at least one of the following: rotation of said motorized apparatus, inspection of a surface by said motorized apparatus, and repair of the surface by said motorized apparatus.

2. The motorized apparatus in accordance with claim 1, wherein said at least one maintenance device comprises said repair tool and an inspection device.

3. The motorized apparatus in accordance with claim 2, wherein said inspection device comprises at least one of the following: a visual sensor, an acoustic sensor, a mechanical sensor, a thermal sensor, an eddy current sensor, and a magnetic sensor.

4. The motorized apparatus in accordance with claim 1 further comprising a plurality of wheels, wherein said motor is drivingly coupled to said plurality of wheels.

5. The motorized apparatus in accordance with claim 1 further comprising a communication component configured to remotely communicate with a controller.

6. The motorized apparatus in accordance with claim 5, wherein the communication component comprises a wireless transceiver configured to receive information from the controller and/or send information to the controller.

7. The motorized apparatus in accordance with claim 5, wherein said communication component is further configured to send inspection information of the turbine assembly to the controller.

8. The motorized apparatus in accordance with claim 5, wherein said communication component is configured to receive user inputs relating to control of said motorized apparatus.

9. The motorized apparatus in accordance with claim 1, wherein said repair device comprises at least one of the following: an applicator, a drill, a grinder, and a heater.

10. A system for maintaining a turbine assembly, said system comprising:
    a motorized apparatus comprising:
       a body configured to move through the turbine assembly;
       at least one maintenance device coupled to said body, wherein said at least one maintenance device comprises a repair tool;
       a drive system configured to move said body relative to the turbine assembly, said drive system comprising a motor and a steeling component, said steering component configured to steer said motorized apparatus relative to the turbine assembly;
       a communication component configured to perform at least one of the following: receive information and send information;
       a coupling mechanism configured to couple said body to an interior surface of the turbine assembly during motion along the interior surface; and
       an anchoring component configured to maintain said motorized apparatus in position relative to the interior surface of the turbine assembly during at least one of the following: rotation of said motorized apparatus, inspection of a surface by said motorized apparatus, and repair of the surface by said motorized apparatus; and
    a controller positioned remotely from said motorized apparatus, said controller configured to perform at least one of the following: send information to said motorized apparatus and receive information from said motorized apparatus.

11. The system in accordance with claim 10 further comprising a localization system configured to determine a position of said motorized apparatus relative to the turbine assembly.

12. The system in accordance with claim 10, wherein said at least one maintenance device comprises said repair tool and an inspection device.

13. The system in accordance with claim 12, wherein said repair tool comprises at least one of the following: an applicator, a drill, a grinder, and a heater, and wherein said inspection device comprises at least one of the following: a visual sensor, a mechanical sensor, a temperature sensor, a magnetic sensor, an infrared sensor, an acoustic sensor, an inclinometer, a rotational velocity sensor, and an eddy current sensor.

14. The system in accordance with claim 13, wherein said inspection device comprises a camera and said controller comprises a user interface to display image information of the turbine assembly based on information received from said motorized apparatus.

15. The system in accordance with claim 10 further comprising a user interface configured to enable a user to input information relating to control of said, motorized apparatus.

16. The system in accordance with claim 10, wherein said motorized apparatus further comprises a plurality of wheels, wherein said motor is drivingly coupled to said plurality of wheels.

17. The system in accordance with claim 10 further comprising a memory configured to store maintenance information collected by said motorized apparatus.

* * * * *